(No Model.) 2 Sheets—Sheet 1.
S. HIRSCHFELDER.
PHOTOGRAPHIC CAMERA.
No. 488,810. Patented Dec. 27, 1892.
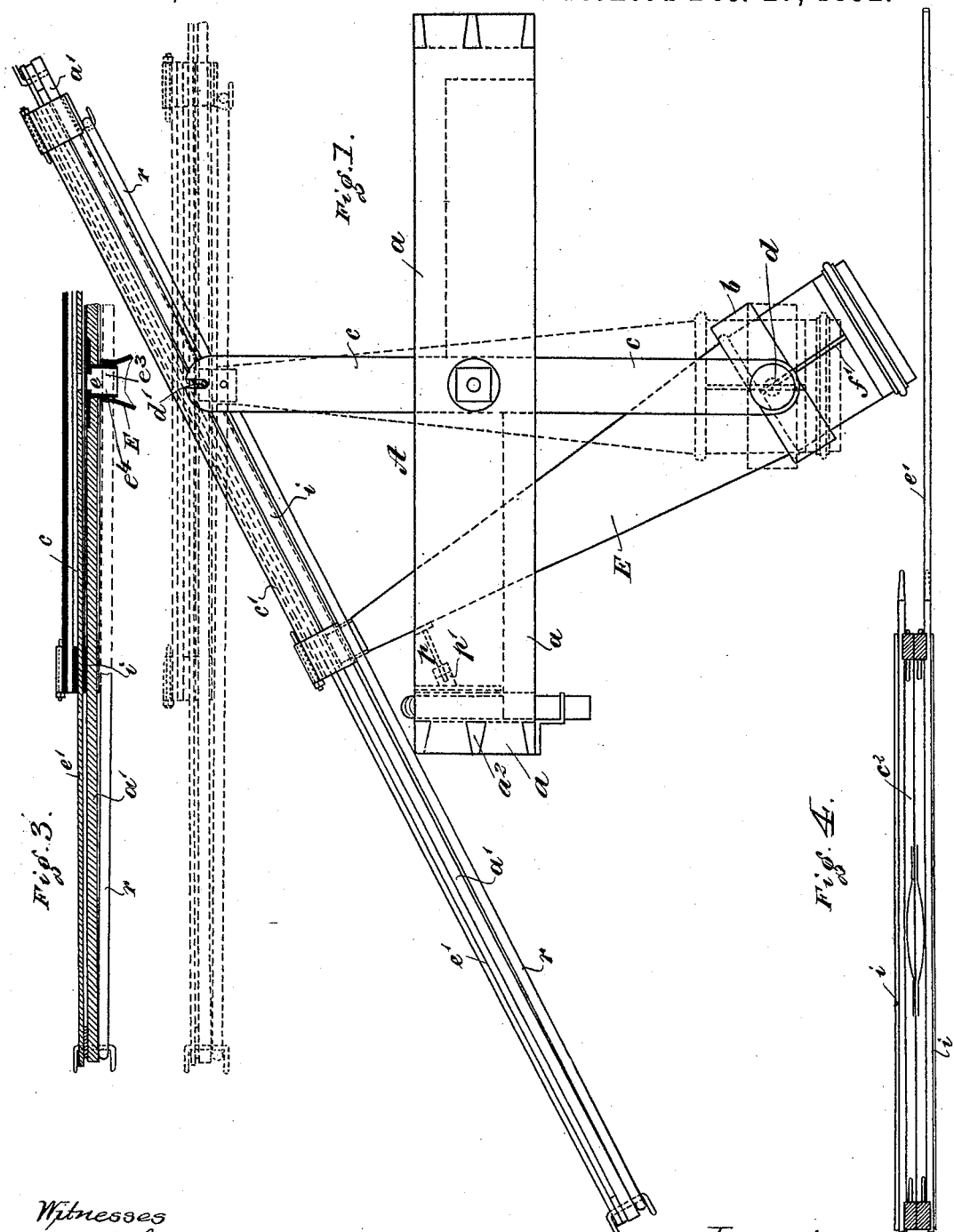
Witnesses
A. J. Schwartz
C. J. Fedrick
Inventor
Salomon Hirschfelder
By MacGeorge
His Attorney (No Model.) 2 Sheets—Sheet 2.
S. HIRSCHFELDER.
PHOTOGRAPHIC CAMERA.
No. 488,810. Patented Dec. 27, 1892.
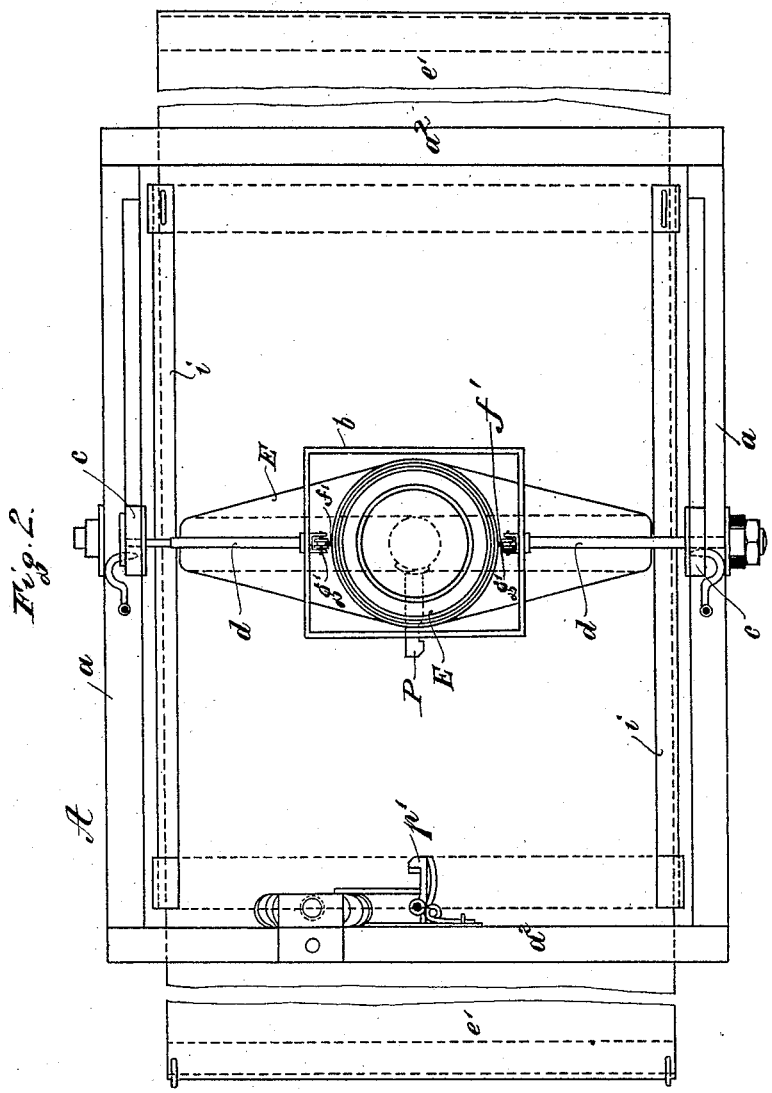
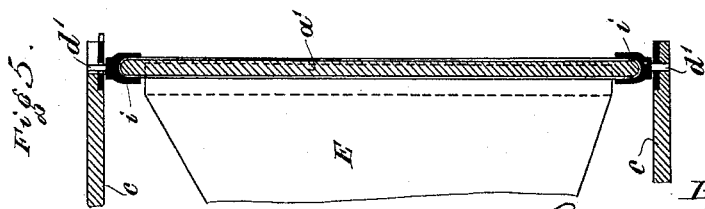
Witnesses
A. J. Schwartz
C. J. Hedrick
Inventor
Salomon Hirschfelder
By Max Henzie
his Attorney

UNITED STATES PATENT OFFICE.

SALOMON HIRSCHFELDER, OF MUNICH, GERMANY.

PHOTOGRAPHIC CAMERA.

SPECIFICATION forming part of Letters Patent No. 488,810, dated December 27, 1892.

Application filed March 18, 1892. Serial No. 425,404. (No model.)

*To all whom it may concern:*

Be it known that I, SALOMON HIRSCHFELDER, a citizen of the Kingdom of Bavaria, and a resident of Munich, Bavaria, Germany, have invented certain new and useful Improvements in Photographic Apparatus, of which the following is a specification.

This invention relates to cameras in which the exposure does not occur simultaneously over the entire plate, but wherein an exposure slit is moved or carried over said plate. The incident light from the lens, and wherein the lens and exposure slit follow so to speak, the movements of moving objects such as vehicles, animals, men &c., every portion of the object, which has already acted on the plate, being immediately covered.

I have found in using an apparatus of this character, that it is necessary to cause the lens to recede or move away from the object as it comes opposite the middle portions and to advance forward toward the object as it approaches the sides of the plate in order that broad, flat objects would show as distinctly at their outer portions as at their middle.

For these purposes and to carry out the effects above outlined, my invention consists in the details, features and combinations of parts hereinafter pointed out and covered in the claims.

In the accompanying drawings which represent photographic apparatus which I consider the best embodiment of my invention—Figure 1, represents a plan, and Fig. 2, a front elevation of the same, while Figs. 3, 4 and 5, are detail views.

By referring to these drawings it will be noted, that the camera proper or funnel, E, is mounted in a frame, A, composed of the rectangular frame, $a$ $a^2$, $a$ $a^2$, (having the upper and lower pieces $a$, $a$, and the side-pieces $a^2$, $a^2$,) and the cross pieces or brackets, $c$, $c$, attached to the upper and lower pieces, $a$, $a$, and extending forwardly and rearwardly and at right-angles with respect to, and so as to form a cross with the same. The plate-holder frame, $i$, is centrally pivoted at $d'$, at the ends of the brackets, $c$. The upper and lower transverse pieces of the guide-frame, $i$, are U-shaped in cross-section, (see Fig. 5) thereby forming guide-ways. A board or plate of sheet-metal or the like, $a'$, having twice the length of the guide-frame, $i$, is arranged in these guide-ways, so as to be readily shifted therein. This board or cover, $a'$, is provided at its middle with a vertical slit, $e^3$, to whose side-flanges, $e^4$, the funnel, E, is secured with its exposure-slit, so as to be readily released (see Fig. 3). The slit of the cover, $a'$, hence forms the continuation of the exposure-slit $e$. Single plate-holders, $c'$, (Fig. 3), of card-board or cloth, or double plateholders of sheet-metal, wood or the like, (Fig. 4) may be employed in the guide-frame, $i$. The slides, $e'$, of the plate-holders are preferably made of the same length as the boards or covers, $a'$, and are fastened at both ends to the latter, and may, therefore, be shifted with the same. Of course the plate holder slide is also provided with a slit coincident with the slit in the board or cover, $a'$, and the funnel E.

Fig. 1 shows the apparatus in a set condition. When the same is not set, the funnel, E, and the board or cover, $a'$ and the plate-holder occupy the opposite position, *i. e.*, the funnel E, bears against the opposite side frame and the board $a'$, projects from the opposite side. The latter, therefore, is then on the left half of the board, $a'$. In both positions, however, the exposure-slit is brought behind the vertical parts of frame, $i$, and is hence covered by the same to exclude the light. A rubber-spring or band, $r$, is secured at one end to one corner of the board or plate, $a'$, while its other end is made fast to the horizontally opposite corner of the frame, $i$.

The funnel or camera proper, E, is mounted near its forward end in a frame, $b$, pivotally mounted between the brackets, $c$, $c$, by means of trunnions or journals, $d$. The lens-holder is of considerable length, and is provided with an erect longitudinal guide-strip, $f'$, at top and bottom, which guide-strips are exactly parallel to the axis of the lens. By means of these guide-strips and the rollers $g'$, mounted in the interior of the frame, $b$, and directly above its journals, $d$, and which rollers engage the guide-strips, the funnel, E, is moved back and forth during the exposure. Hence, the light-funnel, E, does not simply swing, but also reciprocates in the direction of its axis.

It has been found in using an apparatus of this character that in taking views of broad flat objects, *e. g.* a house, the lateral portions of the same appeared less distinctly in the picture than the middle portions of the same, although the light was the same on all portions of the plate. An investigation into the causes showed that this effect was due to the greater distance of the lateral portions of the object from the fixed lens, as compared with the middle portions. These objections I have removed by causing the lens to recede as it comes opposite the middle portions (as indicated in Fig. 1 in dotted lines) and to advance forward as it approaches the end of the plate.

The apparatus is set by pushing the board, $a'$, into the frame, $i$, whereby the spring or rubber-band, $r$, is stretched (Fig. 1). As the exposure-slit of the funnel, E, approaches to the pivot, $d'$, of the frame, $i$, the funnel, and hence the lens, is retracted, simultaneous therewith to the circular movement of the plate-holder-frame, $i$, to be again advanced after the point, $d'$, has been passed. In this manner the differences in distance referred to above, are equalized and every object on the picture appears complete and of uniform distinctness from one end to the other. On the proper side-wall of the funnel is arranged a locking hook $p$, which is adapted to engage with a latch, $p'$, or the like, which is adapted to be readily released and which locks the funnel, E, after it has been set, (see Figs. 1 and 2.) The latch may be released in any suitable or desired manner. Upon releasing the latch the rubber-band or spring, $r$, rapidly contracts, whereby the board or cover, $a'$, with the exposure-slit of the funnel is rapidly carried along in the U-shaped guides of frame, $i$, and over the sensitized plate until it has reached the position opposite that indicated in Fig. 1, the slide, $e'$, closing off the plate "light-tight" on both sides of the exposure-slit.

What I claim and desire to secure by Letters Patent is:—

1. In photographic apparatus a support for the plate-holder pivoted on a suitable frame, a plate-holder mounted thereon and provided with a slide having a slot therein in combination with a camera pivoted at its forward end and provided at its rear end with an exposure-slit, a cover as $a'$, connected to the plate-holder slide and to the frame of the camera and having a slot registering with the exposure slot of the camera and the slot in the plate-holder, and a spring or elastic band, as $r$, connecting the plate-holder support with the cover, $a$, substantially as set forth.

2. In a photographic apparatus a pivotally mounted camera provided with a rear exposure slit, in combination with a sliding plate carrier adapted to slide across the exposure-slit and means for causing the camera to move in and out simultaneously with its pivotal movement, substantially as set forth.

3. In a photographic apparatus a camera supported at its forward end in a pivotal frame and provided with a rear exposure slit, in combination with a plate holder adapted to slide across the exposure slit and means for causing the camera to move in and out simultaneously with its pivotal movement, substantially as set forth.

4. In a photographing apparatus, a pivotal frame mounted in a suitable camera support and provided with a grooved friction roller or rollers, in combination with a camera having an exposure-slit, at its rear and provided with a longitudinal guide-strip or strips engaging the grooved friction-rollers and a plate-holder pivoted in the camera-support and connected with the rear end of the camera, substantially as set forth.

5. In a photographing apparatus, a pivotally mounted camera having an exposure-slit at its rear and means for causing the camera to slide in and out simultaneously with its pivotal movement in combination with a plate-holder mounted on a pivotal frame and provided with a slotted slide and a sliding cover, as $a'$, provided with a slot registering with the exposure-slit of the camera and the slot in the slide, substantially as set forth.

6. In a photographing apparatus, a pivotal frame mounted in a suitable camera-support and provided with a grooved friction roller or rollers, in combination with a camera having an exposure-slit at its rear and provided with a longitudinal guide-strip or strips engaging the grooved friction roller or rollers, a plate-holder mounted on a pivotal frame and provided with a slotted slide longer than the plate-holder, and a sliding cover, as $a'$, having a slot registering with the exposure-slit of the camera and the slot in the slide, substantially as set forth.

In testimony that I claim the foregoing as my invention I have signed my name in presence of two subscribing witnesses.

SALOMON HIRSCHFELDER.

Witnesses:
ALBERT WEICKMANN,
CARL MAYER.